United States Patent
Curtiss

(10) Patent No.: US 7,048,222 B1
(45) Date of Patent: May 23, 2006

(54) CORD STORAGE DEVICE

(76) Inventor: Gordon H. Curtiss, 1335 Corley Ct., West Columbia, SC (US) 29170

(*) Notice: Subject to any disclaimer, the term of this patent is extended or adjusted under 35 U.S.C. 154(b) by 63 days.

(21) Appl. No.: 10/899,994

(22) Filed: Jul. 27, 2004

Related U.S. Application Data

(60) Provisional application No. 60/491,330, filed on Jul. 31, 2003.

(51) Int. Cl.
*B65H 75/38* (2006.01)
(52) U.S. Cl. ............... 242/405.1; 242/402; 242/588.2; 242/400.1; 242/613.3; 191/12.2 R
(58) Field of Classification Search ............ 242/405.1, 242/405.2, 405.3, 402, 588, 588.2, 400, 400.1, 242/613.3; 191/12.2 R, 12.4
See application file for complete search history.

(56) References Cited

U.S. PATENT DOCUMENTS

| | | | |
|---|---|---|---|
| 2,231,001 A * | 2/1941 | Engstrom | 174/66 |
| 2,438,143 A * | 3/1948 | Brown | 191/12 R |
| 3,257,497 A * | 6/1966 | Chase | 174/66 |
| 3,290,453 A * | 12/1966 | Jensen | 191/12.4 |
| 3,689,868 A * | 9/1972 | Snyder | 439/501 |
| 4,702,443 A | 10/1987 | Callaway | 248/51 |
| 4,721,268 A | 1/1988 | Lerner et al. | 242/85.1 |
| 4,878,586 A | 11/1989 | Bancroft et al. | 211/106 |
| 4,934,625 A * | 6/1990 | Richardson | 242/597 |
| 5,398,895 A | 3/1995 | Whetherhult et al. | 248/51 |
| 5,421,457 A | 6/1995 | Listenberger | 206/388 |
| 5,613,648 A | 3/1997 | Paavila | 242/405.2 |
| 5,732,898 A | 3/1998 | Odessky et al. | 242/377 |
| D449,513 S | 10/2001 | Stekelenburg | D8/358 |
| 6,302,347 B1 | 10/2001 | Amirault | 242/405.2 |
| D456,692 S | 5/2002 | Epstein | D8/356 |
| 6,382,549 B1 | 5/2002 | Krake | 242/405.2 |
| 6,425,165 B1 | 7/2002 | Koppang | 24/129 R |
| 6,497,382 B1 * | 12/2002 | King | 242/405.2 |
| 6,499,199 B1 | 12/2002 | Frazier | 24/306 |
| 6,536,699 B1 * | 3/2003 | Glass | 242/400.1 |
| 2001/0007298 A1 * | 7/2001 | Glass | 191/12.2 R |

* cited by examiner

*Primary Examiner*—Kathy Matecki
*Assistant Examiner*—Willaim E. Dondero
(74) *Attorney, Agent, or Firm*—John D. Gugliotta; P. Jeff Martin

(57) ABSTRACT

A lightweight, portable cord storage device is provided which is adapted to store and organize a cord member in a manner which prevents twisting, tangling, or crimping of the cord by wounding a selected cord around a pair of cord wounding posts utilizing a figure-eight wrapping method.

4 Claims, 4 Drawing Sheets

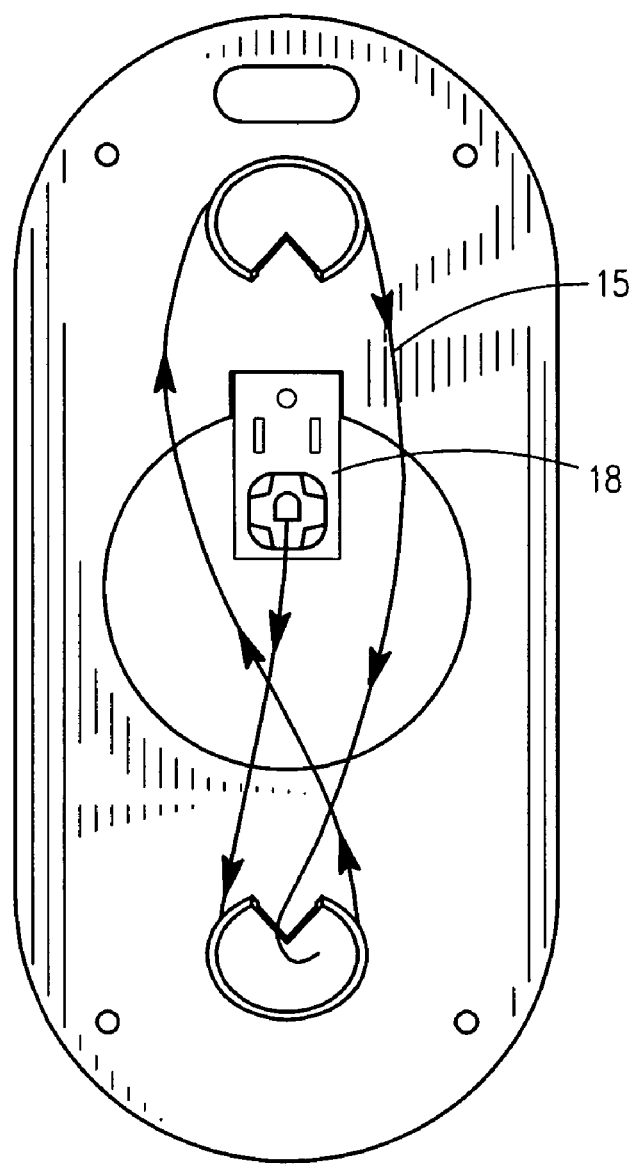
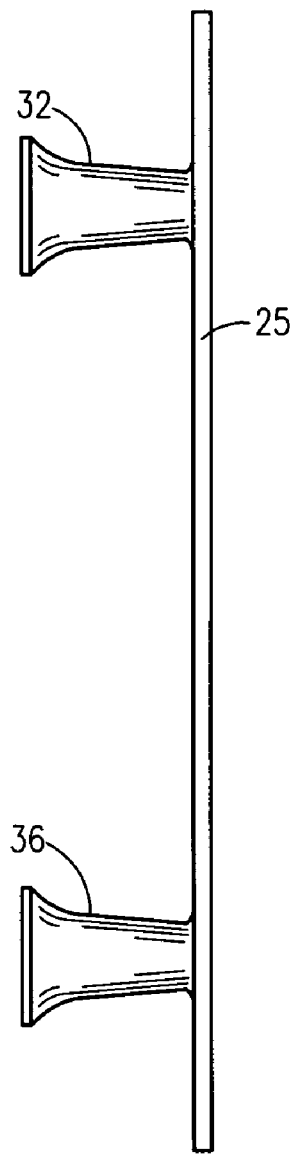
*Fig. 4*
*Fig. 5*

CORD STORAGE DEVICE

RELATED APPLICATIONS

This application claims the benefit of U.S. Provisional Application No. 60/491,330 filed on Jul. 31, 2003.

BACKGROUND OF THE INVENTION

1. Field of the Invention

The present invention relates generally to cord organization devices, and more particularly to a cord storage device adapted to store and organize a cord member in a manner which prevents twisting, tangling, or crimping of the cord by applying a figure-eight wrapping method thereto.

2. Description of the Related Art

Neat, efficient, and safe organization of electrical power cords, cable, hose, rope, and the like finds wide application in household as well as industrial use. The prior art discloses bundling devices consisting of a short length of rope to tie around the bundle of line to secure the line in a coiled loop. These devices have proven inadequate due to their sizeable nature and limitations regarding specific line material being applicable therewith. A wide range of other cord bundling devices have been provided to facilitate the storage and organization of electrical power cords. However, none of these devices have addressed the issue of firm adherence of the cord to the device, and where such device prevents twisting, tangling or crimping of the cord. In addition, none of the prior art devices have addressed the utility of a cord organization device adapted for use with a conventional wall-mounted electrical outlet.

Accordingly, there is a need for a means by which cord members can be stored and organized in a quick, easy, and efficient manner which prevents twisting, tangling or crimping of the cord. The development of the cord storage device fulfills this need.

SUMMARY OF THE INVENTION

Therefore, it is an object of the present invention to provide a cord storage device adapted to store and organize a cord member in a manner which prevents twisting, tangling, or crimping of the cord by applying a figure-eight wrapping method thereto.

It is another object of the present invention to provide a lightweight, portable plate having a plurality of mounting apertures throughwhich fasteners are engaged to fixedly mount the plate to a flat surface.

It is another object of the present invention to provide a pair of spaced, cord wounding posts around which a cord member is wound.

It is another object of the present invention to provide a generally rectangular mortise sizably adapted so as to allow positional access to a standard electrical outlet.

It is still another object of the present invention to provide a cord storage cavity adapted to provide space for accommodating cord bulk.

It is yet another object of the present invention to provide a handle in the form of an elongated foramen.

Briefly described according to one embodiment of the present invention, a cord storage device is provided for efficiently storing and organizing elongated, flexible cord members in a manner which prevents twisting, tangling, or crimping thereof. The cord storage device comprises an elongated, generally oval-shaped plate and is envisioned as being constructed from various fabrication materials including but not limited to wood and plastic. Each corner of the plate is provided with a mounting aperture throughwhich a fastener is engaged to fixedly mount the plate to a flat surface.

A pair of spaced, cord winding posts are provided around which a cord member is wound. An upper cord winding post projects outwardly from the face of the plate, near an upper end thereof. A distal end of the upper cord winding post includes an integral, raised abutment lip which functions as a brace or retainer against which a cord abuts in order to effectively retain a wound cord for storage.

An anchoring slit, formed along a lower side of upper cord winding post, provides an attachment point for a selected cord member.

A lower cord winding post projects outwardly from the face of the plate near a lower end thereof. A distal end of the lower cord winding post includes an integral, raised abutment lip which functions as a brace or retainer against which a cord abuts in order to effectively retain a wounded cord for storage.

An anchoring slit, formed along an upper side of lower cord winding post, provides an attachment point for selected cord members of sizable diameter.

A generally rectangular mortise, located just below upper cord winding post, is provided and sizably adapted so as to allow positional access to a standard electrical outlet when plate is mounted against a wall provided with such outlet.

A handle is provided in the form of an elongated aperture extending through plate. The aperture is positioned just above the upper cord winding post in a horizontal manner to allow easy insertion by fingers of a user, thereby facilitating grasp of the cord storage device and allowing effortless transportability thereof.

In order to accommodate cord bulk which necessarily results when cord member is wrapped around the pair of cord winding posts in an overlapping manner utilizing a figure-eight threading method, a cord storage cavity is disclosed which is located approximately central about plate and extends therethrough. The cord storage cavity generally encircles a perimeter of mortise so as to provide a nesting space between an inner, circular wall of cord storage cavity and an outer wall of mortise.

A selected cord is wrapped around the pair of spaced, cord winding posts utilizing a figure-eight threading process in order to store and organize such cord in a manner which prevents twisting, tangling, or crimping of the cord.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 4 is a front side elevational view of the cord storage device illustrating the figure-eight cord threading process, according to the preferred embodiment of the present invention;

FIG. 5 is a left side elevational view of the cord storage device, according to the preferred embodiment of the present invention.

DESCRIPTION OF THE PREFERRED EMBODIMENT

1. Detailed Description of the Figures

Figure 1:
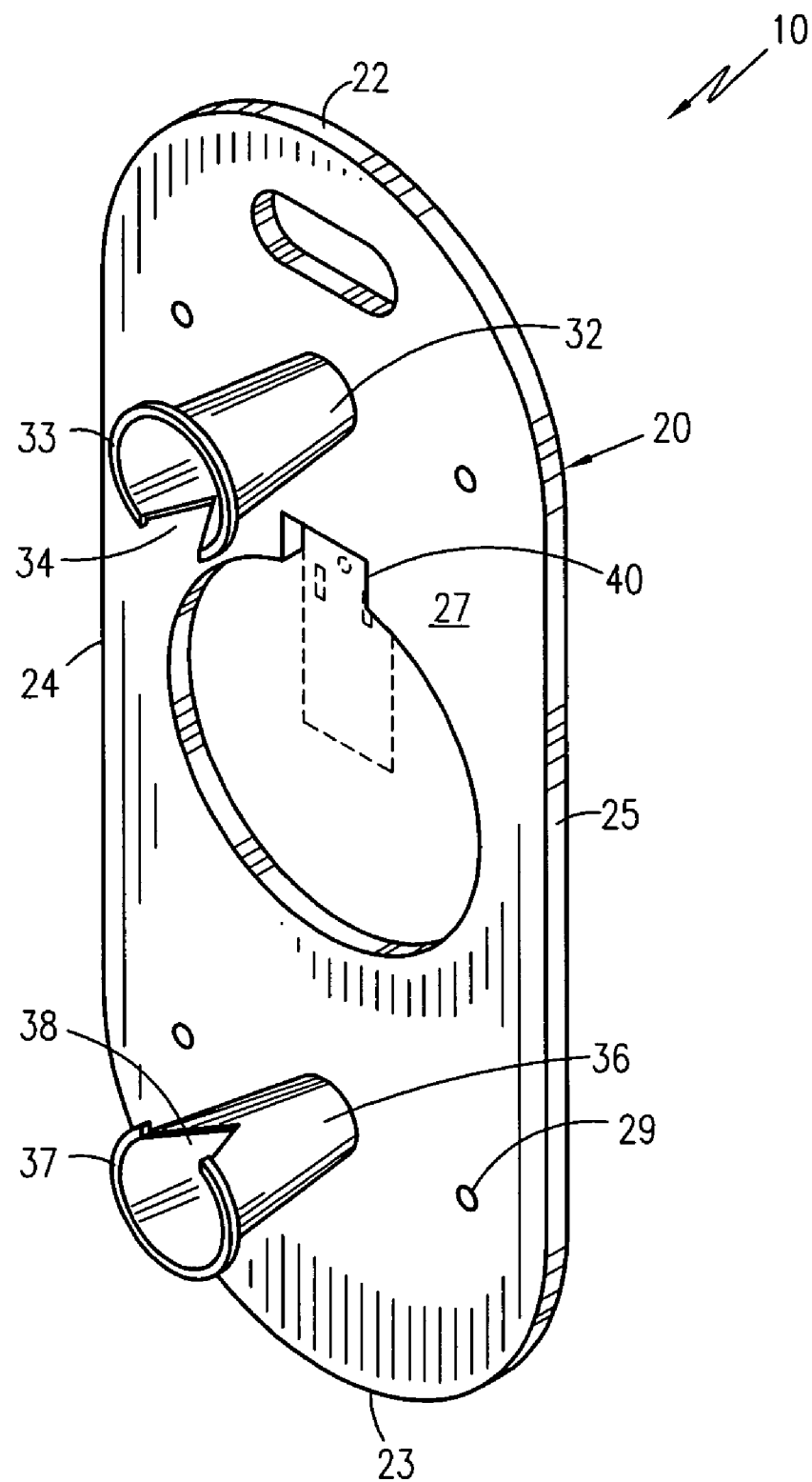
FIG. 1 is a perspective view of the cord storage device, according to the preferred embodiment of the present invention.
Figure 2:
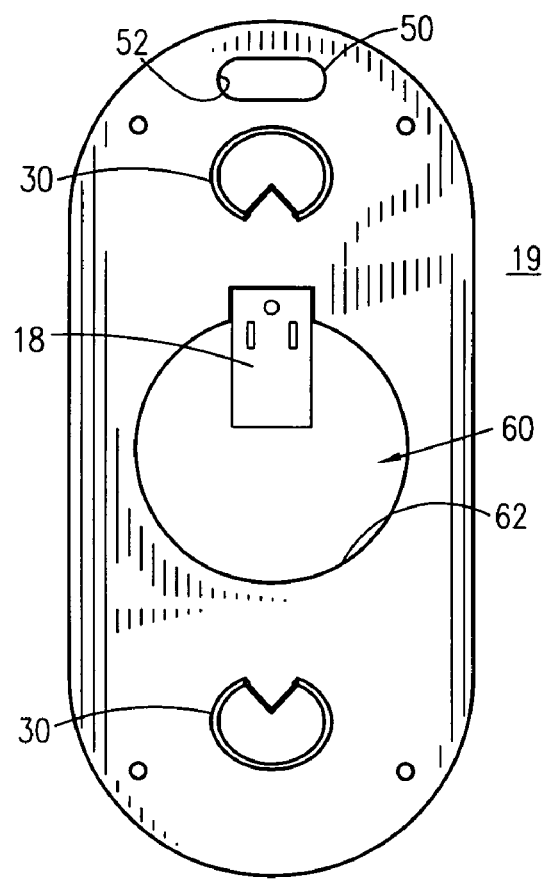
FIG. 2 is a top planar view thereof shown mounted to a flat surface.
Figure 3:
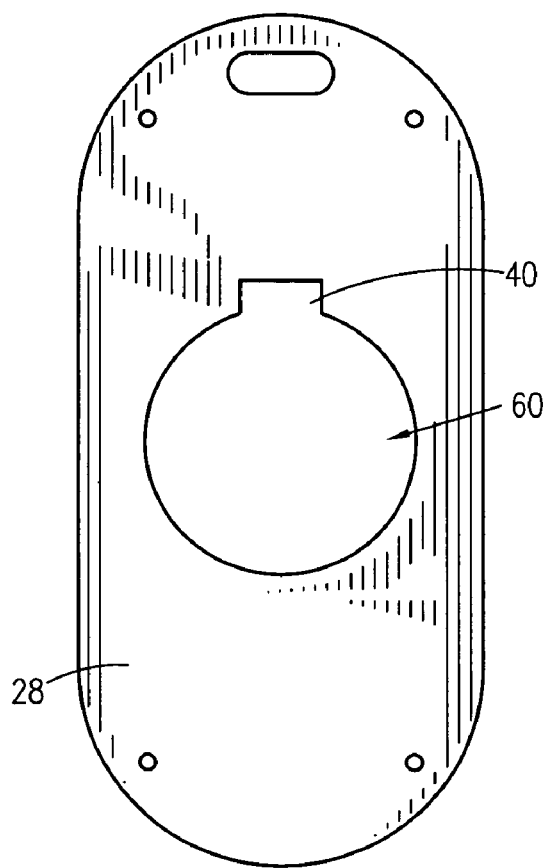
FIG. 3 is a rear side elevational view of the cord storage device, according to the preferred embodiment of the present invention.

Referring now to FIGS. 1–5, a cord storage device 10 is shown and described herein, according to the present invention, adapted to efficiently store and organize elongated, flexible cord members 15 in a manner which prevents twisting, tangling, or crimping thereof. For purposes of this disclosure, cord members 15 are defined as including but not limited to electrical power cords, hose, rope, string, cable, and flat line.

The cord storage device 10 comprises an elongated, generally oval-shaped plate 20 having an upper curved wall 22 opposing a lower curved wall 23, and a first side wall 24 opposing a second side wall 25. The cord storage device 10 further comprises a face 27 opposing a planar bottom 28. The plate 20 is envisioned as being constructed of various fabrication materials including but not limited to wood and plastic. Each corner of the plate 20 is provided with a mounting aperture 29 throughwhich a fastener is engaged to fixedly mount the plate 20 to a flat surface 19, for example, a wall or floor.

A pair of linearly spaced, cord winding posts 30 are provided around which a cord member 15 is wound. An upper cord winding post 32, of a generally round, hollow configuration, projects outwardly from the face 27 of the plate 20, near an upper end thereof. A distal end of the upper cord winding post 32 includes an integral, raised abutment lip 33 which functions as a brace or retainer against which a cord 15 abuts in order to effectively retain a wound cord for storage.

An anchoring slit 34, formed along a lower side of upper cord winding post 32, provides an attachment point for a selected cord member 15. The anchoring slit 34 tapers inwardly from the abutment lip 33 of the upper cord winding post 32 to the face 27 of plate 20.

A lower cord winding post 36, of a generally round, hollow configuration, projects outwardly from the face 27 of the plate 20 near a lower end thereof. A distal end of the lower cord winding post 36 includes an integral, raised abutment lip 37 which functions as a brace or retainer against which a cord 15 abuts in order to effectively retain a wound cord for storage. While both the upper cord winding post 32 and lower cord winding post 36 preferably define a generally round configuration, it is envisioned that each post 32, 36 may be defined of other shapes including oval.

An anchoring slit 38, formed along an upper side of lower cord winding post 36, provides an attachment point for selected cord members 15 of sizable diameter. The anchoring slit 38 tapers inwardly from the abutment lip 37 of the lower cord winding post 36 to the face 27 of plate 20. The anchoring slit 38 of lower cord winding post 36 is further defined as having a greater angular measure with respect to anchoring slit 34 of upper cord winding post 32.

A generally rectangular mortise 40, located just below upper cord winding post 32, forms an opening which extends through plate 20, and is sizably adapted so as to allow positional access to a standard electrical outlet 18 when plate 20 is mounted against a wall provided with such outlet 18.

A handle 50 is provided in the form of an elongated aperture 52 extending through plate 20 along an upper portion thereof. The aperture 52 is positioned just above the upper cord winding post 32 in a horizontal manner to allow easy insertion by fingers of a user, thereby facilitating grasp of the cord storage device 10 and allowing effortless transportability thereof.

In order to accommodate cord 15 bulk which necessarily results when cord member 15 is wrapped around the pair of cord winding posts 30 in an overlapping manner utilizing a figure-eight threading method, a cord storage cavity 60 is disclosed. The cord storage cavity 60 is located approximately central about plate 20 and extends therethrough. The cord storage cavity 60 extends integrally downward from mortise 40 forming a generally circular opening adapted to provide space for accommodating cord 15 bulk. In addition, the cord storage cavity 60 allows for the cord storage device 10 to be light in weight.

During storage operation, a working end of a selected cord 15 is impinged within anchoring slit 34, 38 of a compatible cord winding post 30. The cord 15 is then wrapped either clockwise or counter-clockwise around such winding post 30 in an overlapping manner, then threaded to remaining winding post 30 in a figure-eight manner, whereupon the figure-eight threading process is continued until either an entire length or a substantial portion of such cord 15 is effectively and storably wrapped to cord storage device 10 in a manner which prevents twisting, tangling, or crimping of the cord 15. Finally, the opposite working end of cord 15 is impinged within anchoring slit 34, 38 of the cord winding post 30 being most proximal to opposite working end, while the cord storage cavity 60 provides space for accommodating the accumulation of cord 15 bulk.

Referring more specifically to FIG. 4, alternatively, when cord storage device 10 is mounted to a wall with mortise 40 providing access to a standard electrical outlet 18, and where a working end of cord 15 is plugged therein, the working end of the cord 15 is threaded downward away from outlet and wrapped under and across lower cord winding post 36 in either a clockwise or counter-clockwise manner. The cord 15 is then directed up and over the upper cord winding post 32, then directed back to lower cord winding post 36 in a figure-eight manner. The figure-eight threading process is continued until either an entire length or a substantial portion of such cord 15 is effectively and storably wrapped to cord storage device 10 in a manner which prevents twisting, tangling, or crimping of the cord 15. Finally, the opposite working end of cord 15 is impinged within anchoring slit 34, 38 of the cord winding post 30 being most proximal to opposite working end, while the cord storage cavity 60 provides space for accommodating the accumulation of cord 15 bulk.

Figure 6:
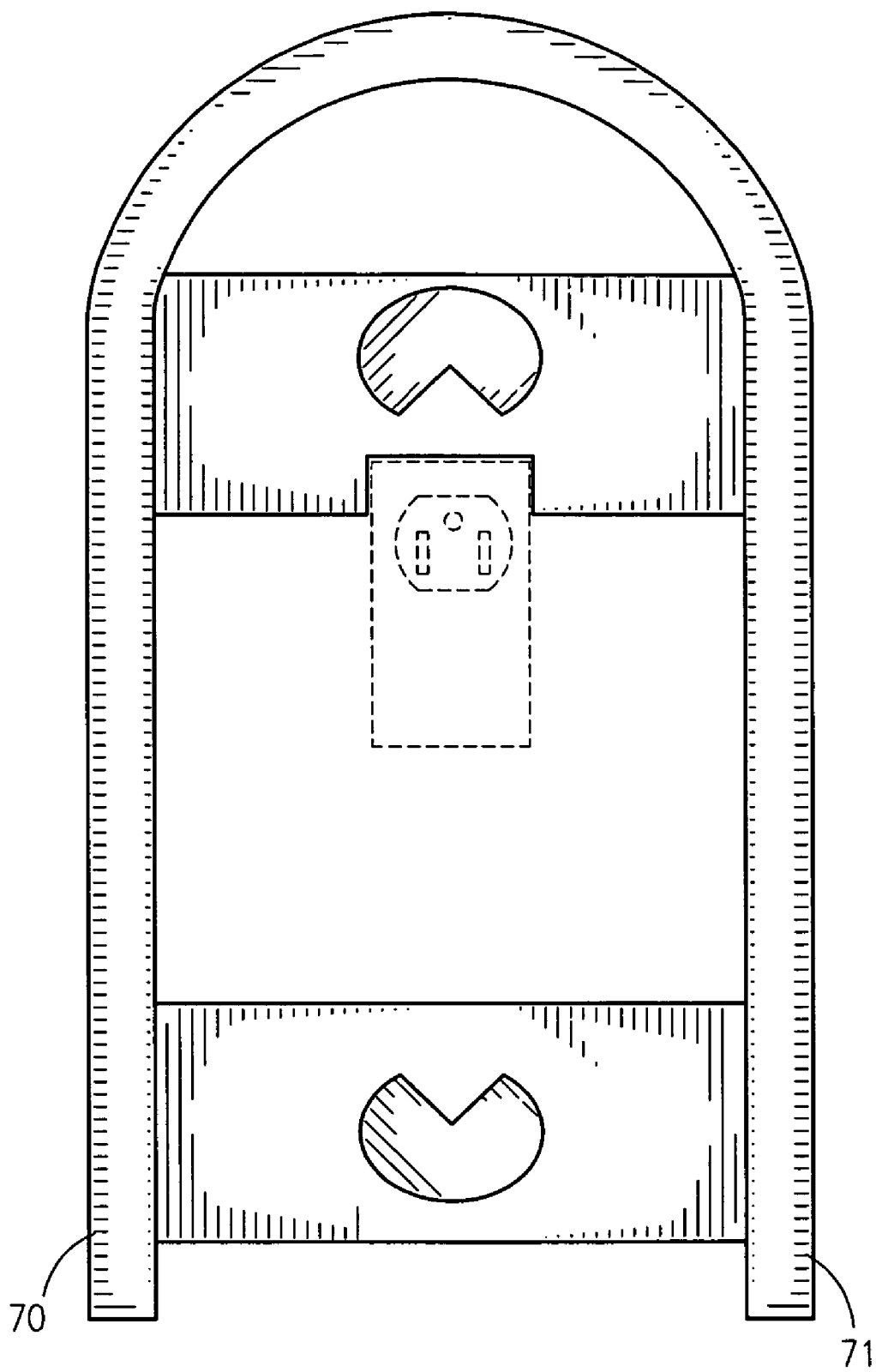
FIG. 6 illustrates an alternate embodiment of the present invention.

FIG. 6 illustrates an alternate embodiment of the present invention. The alternate embodiment provides a design being favorable to injection molding. The alternate embodiment includes opposing sidewalls, wherein each sidewall extends downward forming a pair of leg members 70, 71 which allows the design to be independently supported in an upright position.

2. Operation of the Preferred Embodiment

To use the present invention, user impinges the working end of a selected cord 15 within appropriate anchoring slit 34, 38 of a compatible cord winding post 30. User next wraps the cord 15 either clockwise or counter-clockwise around such winding post 30 in an overlapping manner, then threads cord 15 to remaining winding post 30 in a figure-eight manner, whereupon user repeats the figure-eight threading process until either an entire length or a substantial portion of such cord 15 is effectively and storably wrapped to cord storage device 10 in a manner which prevents twisting, tangling, or crimping of the cord 15. Finally, user impinges the opposite working end of cord 15 within appropriate anchoring slit 34, 38 of the cord winding post 30 being most proximal to opposite working end.

The use of the present invention allows cord members to be stored and organized in a quick, easy, and efficient manner which prevents twisting, tangling or crimping of the cord.

Therefore, the foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be broadly limited only by the following Claims.

What is claimed is:

1. A cord storage device comprising:
   a plate, said plate is of an elongated, generally oval-shaped configuration, said plate having an upper curved wall opposing a lower wall, a first side wall opposing a second side wall, and a face opposing a planar bottom;
   a pair of cord winding posts, said pair of cord winding posts is spaced linearly and project outwardly from said face of said plate, said pair of cord winding posts is adapted to have a cord member securably wound therearound, wherein said pair of cord winding posts comprises:
   an upper cord winding post, said upper cord winding post is of a generally round, hollow configuration, said upper cord winding post projects outwardly from said face of said plate, near an upper end of said plate, said upper cord winding post has a distal end defining an integral, raised abutment lip which functions as a brace or retainer against which a cord member abuts in order to effectively retain a wounded cord member for storage wherein said upper cord winding post includes an anchoring slit formed along a lower side of said upper cord winding post, said anchoring slit provides an attachment point for a selected cord member, and wherein said anchoring slit tapers inwardly from said abutment lip of said upper cord winding post to said face of said plate;
   a lower cord winding post, said lower cord winding post is of a generally round, hollow configuration, said lower cord winding post projects outwardly from said face of said plate near a lower end of said plate, said lower cord winding post has a distal end defining an integral, raised abutment lip which functions as a brace or retainer against which a cord member abuts in order to effectively retain a wound cord for storage;
   a mortise, said mortise is of a generally rectangular configuration, said mortise forms an opening which extends through said plate, wherein said mortise is sizably adapted so as to allow positional access to a standard electrical outlet upon mounting of said plate against a flat surface provided with the standard electrical outlet;
   a handle, said handle is defined of an elongated aperture extending through said plate along an upper portion thereof; and
   a mounting aperture, said mounting aperture is provided in each corner of said plate, said mounting aperture is adapted to have a fastener insertably engaged therein in order to fixedly mount said plate to a flat surface.

2. The cord storage device of claim 1, wherein said elongated aperture is positioned just above said upper cord winding post in a horizontal manner to allow easy insertion by fingers of a user, thereby facilitating grasp of said cord storage device and allowing effortless transportability of said cord storage device.

3. The cord storage device of claim 1, further comprising a cord storage cavity, said cord storage cavity is located approximately central about said plate and extends through said plate, wherein said cord storage cavity extends integrally downward from said mortise so as to form a generally circular opening adapted to provide space for accommodating cord member bulk.

4. A cord storage device comprising:
   a plate, said plate is of an elongated, generally oval-shaped configuration, said plate having an upper curved wall opposing a lower wall, a first side wall opposing a second side wall, and a face opposing a planar bottom;
   a pair of cord winding posts, said pair of cord winding posts is spaced linearly and project outwardly from said face of said plate, said pair of cord winding posts is adapted to have a cord member securably wound therearound, wherein said pair of cord winding posts comprises:
   an upper cord winding post, said upper cord winding post is of a generally round, hollow configuration, said upper cord winding post projects outwardly from said face of said plate, near an upper end of said plate, said upper cord winding post has a distal end defining an integral, raised abutment lip which functions as a brace or retainer against which a cord member abuts in order to effectively retain a wound cord member for storage;
   a lower cord winding post, said lower cord winding post is of a generally round, hollow configuration, said lower cord winding post projects outwardly from said face of said plate near a lower end of said plate, said lower cord winding post has a distal end defining an integral, raised abutment lip which functions as a brace or retainer against which a cord member abuts in order to effectively retain a wound cord for storage, wherein said lower cord winding post includes anchoring slit, said anchoring slit is formed along an upper side of said lower cord winding post, said anchoring slit provides an attachment point for selected cord members of sizable diameter, said anchoring slit tapers inwardly from said abutment lip of said lower cord winding post to said face of said plate, and wherein said anchoring slit of said lower cord winding post defines a greater angular measure with respect to said anchoring slit of said upper cord winding post;

a mortise, said mortise is of a generally rectangular configuration, said mortise forms an opening which extends through said plate, wherein said mortise is sizably adapted so as to allow positional access to a standard electrical outlet upon mounting of said plate against a flat surface provided with the standard electrical outlet;

a handle, said handle is defined of an elongated aperature extending through said plate along an upper portion thereof; and a mounting aperture, said mounting aperture is provided in each corner of said plate, said mounting aperture is adapted to have a fastener insertably engaged therein in order to fixedly mount said plate to a flat surface.

* * * * *